United States Patent
Nakamura

[11] 3,870,077
[45] Mar. 11, 1975

[54] LOW-NOISE VALVE

[75] Inventor: Ichiro Nakamura, Katsuta, Japan

[73] Assignee: Hitachi, Ltd., Tokyo, Japan

[22] Filed: Feb. 15, 1973

[21] Appl. No.: 332,558

[30] Foreign Application Priority Data
Feb. 18, 1972  Japan................................ 47-16405

[52] U.S. Cl............. 137/614.11, 251/120, 251/125, 137/514
[51] Int. Cl............................................. F16k 47/00
[58] Field of Search........ 137/614.11, 516.29, 513.5, 137/515.3, 515.5, 515.7, 514; 251/362, 358, 251/125, 120, 64; 138/147, 153, 28, 30, 31

[56] References Cited
UNITED STATES PATENTS

| | | | |
|---|---|---|---|
| 1,045,307 | 11/1912 | McCluskey | 137/516.29 X |
| 2,163,472 | 6/1939 | Shimer | 137/516.29 |
| 2,969,085 | 1/1961 | Nystrom et al. | 251/120 X |
| 3,074,428 | 1/1963 | Mancewicz | 137/514 |
| 3,086,551 | 4/1963 | Gordon | 251/64 X |
| 3,123,128 | 3/1964 | Zeisloft | 137/614.11 X |
| 3,446,473 | 5/1969 | Barker | 251/64 |
| 3,482,415 | 12/1969 | Trask | 251/120 X |
| 3,590,837 | 7/1971 | Jeanise | 137/515.5 X |
| 3,595,265 | 7/1971 | Cryder et al. | 137/513.5 |
| 3,679,326 | 7/1972 | Weber | 138/30 X |

*Primary Examiner*—Charles J. Myhre
*Assistant Examiner*—Ira S. Lazarus
*Attorney, Agent, or Firm*—Craig & Antonelli

[57] ABSTRACT

A low-noise valve comprising a valve body having a valve member disposed in a high-pressure fluid conduit system for controlling the flow of hydraulic fluid from the high pressure to the low pressure side. In the valve, a vibration damping member is mounted on the inner wall of the fluid passage portion on the downstream side of the valve member within the valve body and a back pressure is imparted to the low-pressure downstream side of the valve member so as to absorb the pressure pulsation and noise due to cavitation occurring on the downstream side of the valve member owing to the pressure differential across the valve.

18 Claims, 17 Drawing Figures

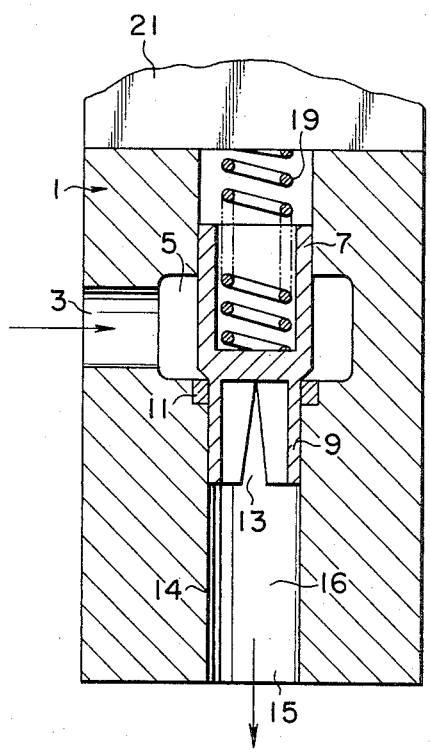
FIG. 1 PRIOR ART
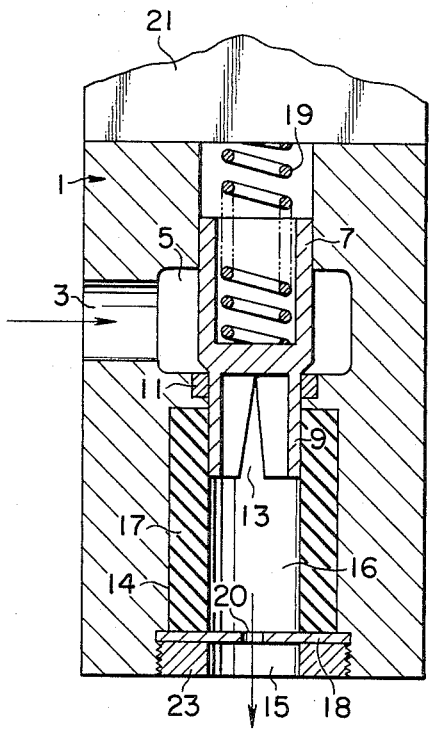
FIG. 2
FIG. 3

LOW-NOISE VALVE

BACKGROUND OF THE INVENTION

This invention relates to valves used in high-pressure fluid conduit systems and more particularly to a valve of the kind above described which is constructed to prevent occurrence of pulsating pressures and vibrations due to cavitation caused by a very large pressure differential across the valve.

In a ram type hydraulic elevator, generally, a cage is mounted at the top of a plunger in a hydraulic cylinder and the speed of the cage is controlled by controlling the flow of hydraulic fluid supplied to the hydraulic cylinder. In this ram type hydraulic elevator, therefore, so-called bleed-off control is employed so that, during the upward movement of the cage, a portion of the fluid discharged from a fixed displacement hydraulic pump is returned to a fluid reservoir while controlling the fluid flow by a flow control valve and the remaining flow-controlled fluid portion is supplied to the hydraulic cylinder. On the other hand, during the downward movement of the cage, the total flow of the fluid discharged from the hydraulic cylinder is controlled by the flow control valve. Thus, the flow control valve is operated in both the cases of the upward movement and the downward movement of the cage, and the fluid pressure at the inlet of the flow control valve is substantially equal to the fluid pressure in the hydraulic cylinder, while the pressure at the outlet of the flow control valve is substantially equal to the atmospheric pressure. Consequently, the pressure differential across the flow control valve, that is, the difference between the pressure of the fluid at the upstream side of the valve member in the flow control valve and the pressure of the fluid at the downstream side of the valve member amounts to 20 to 50 kilograms per square centimeter and the velocity of the fluid flowing through the valve amounts to 30 to 80 meters per second. As a result, the static pressure at the downstream side of the valve member is reduced and cavitation tends to occur vigorously. The cavitation occurring in this manner coacts with a high pulsating pressure to give rise to a noise of considerable magnitude which would amount frequently to 80 to 90 phons (C-scale).

However, because of such advantages that the hydraulic elevator gives a comfortable sense of ride and does not impose a burden on the building, the hydraulic elevator is widely used in buildings of relatively low height such as apartments, hotels, hospitals and offices. However, even a low sound is sensed noisy in the buildings of this kind due to the fact that living rooms, sick wards and offices are disposed adjacent to the machinery room and shaft, the elevator is intermittently operated in the night, and the cavitation noise includes high-frequency components having frequencies higher than 1 kilohertz. The noise produced in the machinery room must also be minimized since it is transmitted to adjoining rooms and passages through doors and walls. However, the cavitation noise is extremely high compared with the latter noise as above described and it is strongly demanded to minimize this cavitation noise.

Heretofore, a sound damping material has been applied to the inner walls of the machinery room to prevent such a cavitation noise from being transmitted to the adjoining rooms and passages. However, this method has been defective in that the sound damping material is required in large amounts due to the large inner wall area of the machinery room resulting in high costs.

SUMMARY OF THE INVENTION

It is a primary object of the present invention to provide a valve which minimizes cavitation due to the pressure differential thereacross and absorbs undesirable pressure pulsations, and vibrations.

In accordance with the present invention which attains the above object, there is provided a low-noise valve comprising a valve body having a valve member disposed in a high-pressure fluid conduit system for controlling the flow rate of hydraulic fluid from the high-pressure to the low pressure side, vibration damping means disposed within said valve body along the inner wall of the fluid passage portion on the downstream side of said valve member, and means for imparting a back pressure to the low-pressure downstream side of said valve member.

Another object of the present invention is to provide a low-noise valve of the above character in which an optimum back pressure can be imparted to the fluid passage portion on the downstream side of said valve member for minimizing the cavitation.

A further object of the present invention is to provide a low-noise valve of the above character in which the ratio between the fluid pressures on the upstream and downstream sides of said valve member can be maintained substantially constant.

Still another object of the present invention is to provide a low-noise valve of the above character in which the vibration damping means is easily accessible for maintenance and inspection.

BRIEF DESCRIPTION OF THE DRAWINGS

FIG. 1 is a sectional view of a prior art valve.

FIG. 2 is a sectional view of a valve embodying the present invention.

FIG. 3 is a sectional view of a vibration damping member preferably used in the valve shown in FIG. 2.

DESCRIPTION OF THE PRIOR ART

Figure 4:
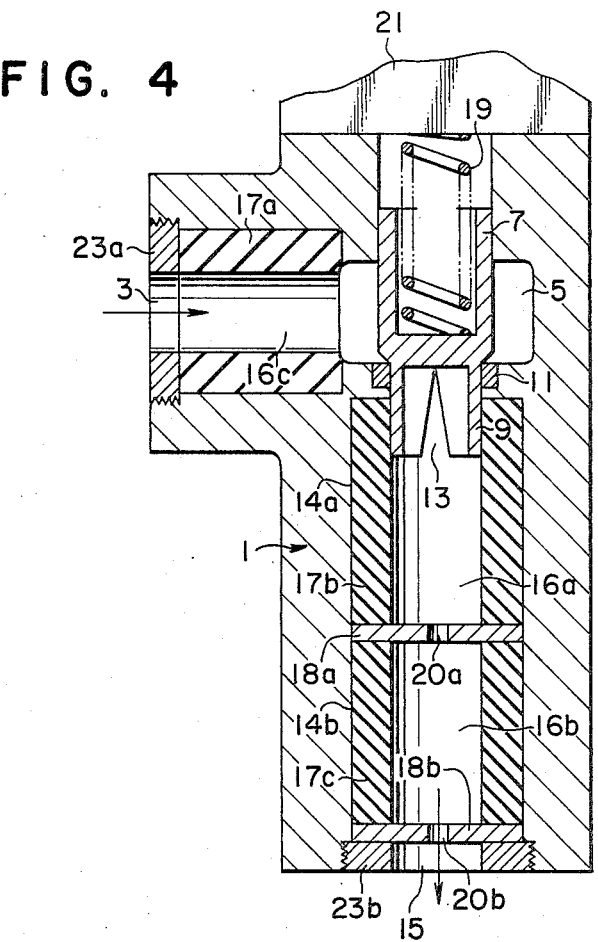
FIG. 4 is a sectional view of another embodiment of the present invention adapted for an application in which the pressure differential across the poppet valve member is extremely large.

Referring to FIG. 1 showing the structure of a prior art valve disposed in a high-pressure fluid conduit system, a valve member consisting of a valve poppet 7 and a valve skirt 9 is normally kept in a closed position in a valve body 1 by a spring 19. Fluid under pressure flows into the valve through an inlet 3 in the valve body 1 and flows out from an outlet 15 through an orifice 13 formed in the valve skirt 9 and through a fluid passage 16. In FIG. 1, the valve member is shown in its full closed position and the hydraulic fluid flowing into the valve from the inlet 3 is stored temporarily in a fluid chamber 5. Then, when the valve poppet 7 is moved axially upwardly by the actuation of control means 21, a portion of the orifice 13 formed in the valve skirt 9 is moved to a position above a valve seat 11 and the hydraulic fluid passes through that portion of the orifice 13 to flow into the fluid passage 16. The velocity of the fluid flow passing through the orifice 13 is increased due to the difference between the fluid pressures on the upstream and downstream sides of the orifice 13, and cavitation occurs vigorously on the downstream side of the orifice 13 thereby giving rise to a pressure variation and noise.

The inventors have made a strenuous study and investigation on the cavitation, pressure variation and noise. As a result, it has been found that 1. the pressure variation due to cavitation is pulsative and occurs quite at random in respect of time and there is not any appreciable interrelation between it and the noise due to cavitation. It has been found therefore that the pulsating pressure imparts an impact to the wall of the conduit and a secondary noise is generated from the conduit.

2. When the pressure differential across the valve member is large, that is, when the fluid pressure ratio $P_2/P_1$ between the fluid pressure $P_2$ on the low-pressure downstream side of the valve member and the fluid pressure $P_1$ on the high-pressure upstream side of the valve member is small, cavitation occurs vigorously thereby giving rise to a large pulsating pressure and noise. However, when a back pressure is imparted to increase the fluid pressure $P_2$ on the downstream side of the valve member, cavitation occurs less and the pulsating pressure and noise are reduced. In order to minimize the occurrence of cavitation, a back pressure which will give the ratio $P_2/P_1$ of more than 0.5 must be imparted.

3. In order to reduce the pulsating pressure and noise due to cavitation, therefore, a plurality of flow restricting stages may be provided so as to reduce the fluid pressure $P_1$ down to the atmospheric pressure. However, the ratio $P_2/P_1$ must be selected to be large in order to increase the rate of reduction of the pulsating pressure and noise, and a very large number of flow restricting stages are required in order to reduce the pressure of the high-pressure fluid to the atmospheric pressure. By way of example, eleven flow restricting stages are required when the pressure of the high-pressure fluid is 100 kilograms per square centimeter, the pressure of the fluid flowing out of the final flow restricting stage is 5 kilograms per square centimeter, and the ratio $P_2/P_1$ is 0.75.

4. In view of the fact described in (1), that is, the fact that the pressure variation due to cavitation is pulsating and occurs quite at random in respect of time, a vibration damping member of material such as rubber having a large internal damping factor is preferably disposed on the inner wall of the conduit so as to absorb the pressure pulsation and noise, and a back pressure is preferably imparted to the downstream side of the valve member so as to limit the fluid pressure ratio $P_2/P_1$ to the range of from 0.05 to 0.5. This arrangement is effective in greatly reducing the pressure pulsation and noise and eliminating undesirable high frequency sound components as much as possible thereby reducing the noise which provides a nuisance to the ear. The fluid pressure ratio $P_2/P_1$ should be selected to lie within the above specified range since any appreciable reduction in the pressure pulsation and noise cannot be attained when the ratio $P_2/P_1$ is less than 0.05 and the flow restricting stages are uneconomically required in a very large number when the ratio $P_2/P_1$ is more than 0.5.

DESCRIPTION OF THE PREFERRED EMBODIMENTS

The present invention is based on the finding above described. Referring now to FIG. 2 in which like reference numerals are used to denote like parts appearing in FIG. 1, an embodiment of the present invention includes a vibration damping member 17 of material such as rubber having a large internal damping factor. This vibration damping member 17 may be bonded or otherwise fixed to the inner wall 14 of a fluid passage 16. Alternatively, the vibration damping member 17 may be inserted into the fluid passage 16 and held in place by means such as a locking ring 23. A partition plate 18 having a restriction 20 is interposed between the vibration damping member 17 and the locking ring 23, and the size of this restriction 20 is suitably selected depending on the fluid pressure $P_1$ on the high pressure side for imparting a back pressure. The size of the restriction 20 is so selected that the fluid pressure ratio $P_2/P_1$ between the fluid pressure $P_2$ on the downstream side of the valve member and the fluid pressure $P_1$ on the upstream side of the valve member lies within the range of 0.05 to 0.5.

The vibration damping member 17 is fixed in position by being bonded to the inner wall 14 of the fluid passage 16 or by being inserted in the fluid passage 16 in the manner above described. However, maintenance and inspection for the vibration damping member 17 is not easy in the case of the former arrangement. In the case of the latter arrangement, appearance of a negative pressure in the fluid passage 16 may result in deformation of the vibration damping member 17 tending to clog the fluid passage 16 due to the fact that the vibration damping member 17 is not fixed to the inner wall 14 of the fluid passage 16 and the material thereof has a large internal damping factor. It is therefore preferable to embed a supporting means 29 such as a coil spring in the vibration damping member 17 as shown in FIG. 3 for preventing undesirable deformation of the vibration damping member 17. This assembly is placed in the fluid passage 16. When a coil spring is used as the supporting means, the contact area between the vibration damping member 17 and the coil spring 29 is given by $\pi dl$ where $d$ is the diameter of the strand forming the coil spring and $l$ is the length of the strand. Thus, the wall thickness of the vibration damping member 17 can be selected to be sufficiently large and the contact area between it and the coil spring can be increased. Further, a slight dimensional error in the axial direction can be easily compensated by deflection of the coil spring.

In the embodiment shown in FIG. 2, provision of the vibration damping member 17 in the fluid passage 16 and impartation of back pressure to limit the fluid pressure ratio $P_2/P_1$ to the range of 0.05 to 0.5 are quite effective in reducing the noise. However, the situation is not so simple in the case in which the pressure differential across the valve member is extremely large. FIG. 4 shows a modification of the structure shown in FIG. 2 so as to deal with such a situation. Referring to FIG. 4, an increase in the fluid pressure $P_2$ in a fluid passage 16a relative to a very high fluid pressure $P_1$ applied to the inlet 3 can reduce the cavitation noise occurring on the downstream side of the orifice 13, but due to the fact that the fluid pressure $P_2$ in the fluid passage 16a is considerably high, a large cavitation noise occurs at a restriction 20a of a partition plate 18a. In FIG. 4, an additional partition plate 18b having another restriction 20b is provided so that the fluid pressure ratio between the fluid pressures on the downstream and upstream sides of the restriction 20a lies within the range of 0.05 to 0.5 thereby increasing the fluid pressure in a fluid passage 16b. While two flow restricting stages are shown in FIG. 4, the number of these stages may be suitably increased to deal with a further increase in the fluid pressure applied to the inlet 3 and the fluid pressure ratio between the fluid pressures on the downstream and upstream sides of each stage may be selected to lie within the range of 0.05 to 0.5 for reducing the pressure pulsation and noise due to cavitation. Further, another vibration damping member 17a is disposed in a fluid passage 16c upstream of the valve member in addition to vibration damping members 17b and 17c disposed in the respective fluid passages 16a and 16b downstream of the valve member so that any pulsating pressure due to cavitation occurring on the downstream side may not be transmitted to the upstream side.

Figure 5:
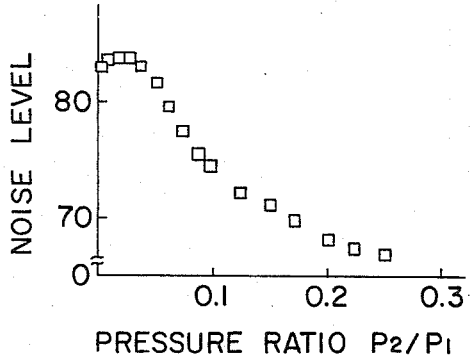
FIG. 5 is a graph showing how the noise level can be reduced by the use of the valve according to the present invention.
Figure 6:
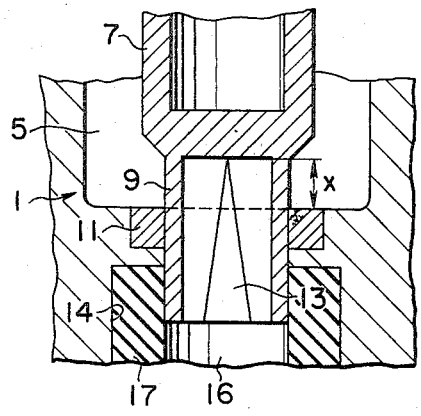
FIG. 6 is a sectional view of parts of the valve according to the present invention when the poppet valve member is lifted by some distance $x$ in the upstream direction.

It will be understood that the pressure pulsation and noise due to cavitation resulting from an abrupt pressure differential can be reduced by the provision of the vibration damping means 17 on the inner wall 14 of the fluid passage 16 in the valve body 1 and by the impartation of back pressure to the downstream side of the valve member so as to limit the fluid pressure ratio $P_2/P_1$ to the range of 0.05 to 0.5. FIG. 5 shows the relation between the noise level and the fluid pressure ratio $P_2/P_1$. It will be seen from FIG. 5 that the noise can be reduced by more than about 20 phons in C-scale. Further, the vibration damping means may be detachably mounted to facilitate maintenance and inspection therefor, and supporting means may be embedded in the vibration damping means for preventing undesirable deformation tending to clog the fluid passage.

The above description has referred to the structure in which a fixed restriction is employed for imparting a back pressure to the downstream side of the valve member so as to limit the fluid pressure ratio $P_2/P_1$ to the range of 0.05 to 0.5.

Figure 7A:
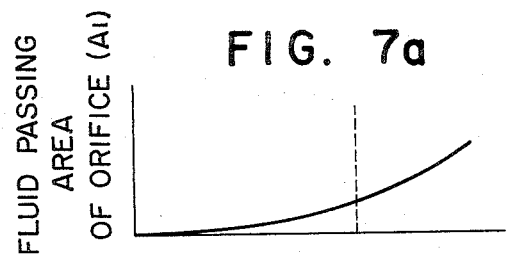
FIGS. 7a, 7b, 7c and 7d are graphs showing the fluid passing area of the orifice, flow rate of fluid passing through the orifice, fluid pressure on the downstream of the poppet valve member, and ratio between fluid pressures on the upstream and downstream sides of the poppet valve member relative to the lifted distance $x$ shown in FIG. 6 respectively.
Figure 7B:
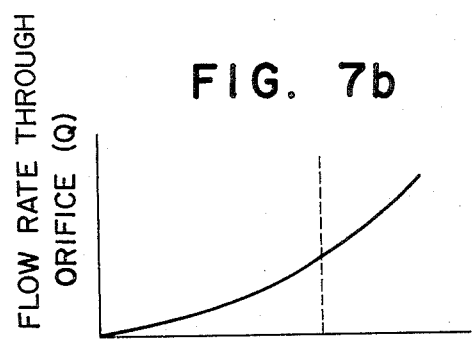
Figure 7C:
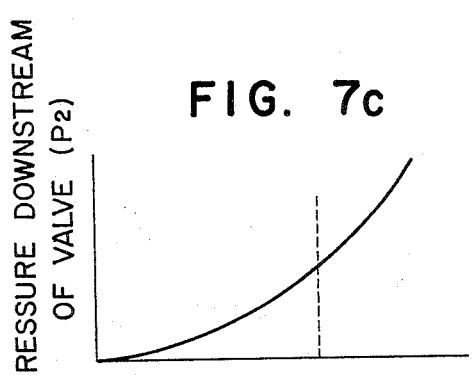
Figure 7D:
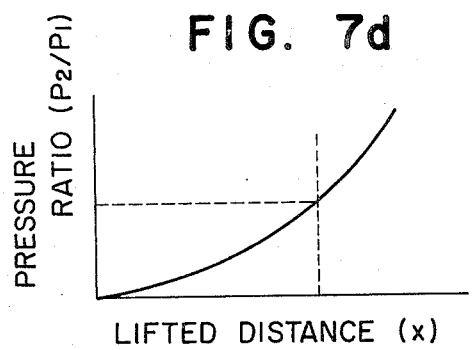

When the valve poppet 7 is moved by some distance $x$ in the upstream direction for controlling the flow of the fluid under pressure, the fluid passing area $A_1$ of the orifice 13, flow rate Q of the fluid passing through the orifice 13, fluid pressure $P_2$ on the downstream side of the valve member and fluid pressure ratio $P_2/P_1$ between the fluid pressures $P_2$ and $P_1$ on the downstream and upstream sides of the valve member vary in a manner as shown in FIGS. 7a, 7b, 7c and 7d respectively provided that the fluid pressure $P_1$ on the upstream side of the valve member is constant. Therefore, when the fluid passing area $A_1$ of the orifice 13 varies relative to the lifted distance $x$ of the valve poppet 7 in a manner as shown in FIG. 7a, the flow rate Q of the fluid passing through the orifice 13 varies in a manner as shown in FIG. 7b, and the fluid pressure $P_2$ on the downstream side of the valve member varies in a manner as shown in FIG. 7c due to the fact that the area of the restriction 20 of the partition plate 18 is fixed. As a result, the fluid pressure ratio $P_2/P_1$ between the fluid pressures $P_2$ and $P_1$ on the downstream and upstream sides of the valve member varies in a manner as shown in FIG. 7d relative to the lifted distance $x$ of the valve poppet 7. As described previously, it is desirable to maintain the fluid pressure ratio $P_2/P_1$ within the range of 0.05 to 0.5 in order to reduce the pressure pulsation and noise due to cavitation. However, with the restriction 20 of the kind above described, it is difficult to obtain a variable flow restricting area. Consequently, the fluid pressure ratio $P_2/P_1$ between the fluid pressures $P_2$ and $P_1$ on the downstream and upstream sides of the valve member varies inevitably as shown in FIG. 7d and it is impossible to maintain the ratio of 0.05 to 0.5 over the entire range of the flow rate.

Another embodiment of the present invention is adapted to continuously maintain the fluid pressure ratio $P_2/P_1$ within the range of 0.05 to 0.5 irrespective of any variations of the flow rate. This embodiment will be described with reference to FIGS. 8 to 10.

Figure 8:
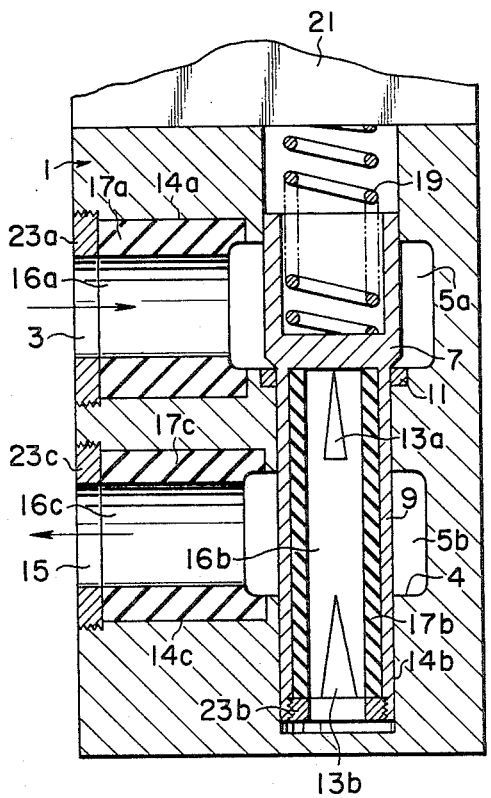
FIG. 8 is a sectional view of another embodiment of the present invention.

Referring to FIG. 8 in which like reference numerals are used to denote like parts appearing in FIG. 4, fluid under pressure flows into a fluid chamber 5a through a fluid inlet 3 and a fluid passage 16a in a valve body 1 and then into another fluid passage 16b through an orifice 13a formed in the upper portion of a valve skirt 9. The hydraulic fluid entering the fluid passage 16b flows into another fluid chamber 5b through another orifice 13b formed in the lower portion of the valve skirt 9 and flows through another fluid passage 16c to be discharged from a fluid outlet 15. The manner of flow rate control in the embodiment shown in FIG. 8 is the same as that in the preceding embodiment, but it differs from the latter in that the orifice 13b is additionally formed in the valve skirt 9 having the orifice 13a so as to apply the fluid pressure $P_2$ to the fluid passage 16b defined within the valve skirt 9. In other words, a plurality of orifices are formed in the valve skirt 9 constituting a part of the valve member as if a plurality of valve members operate in interlocking relation.

This arrangement is advantageous in that the fluid passing area $A_2$ of the orifice 13b varies with the variation of the fluid passing area $A_1$ of the orifice 13a. More precisely, the orifice 13b is full closed and full open when the orifice 13a is in the full closed and full open positions respectively so that the ratio between the fluid passing areas of these orifices can be maintained substantially constant irrespective of any variations of the lifted distance $x$ of the valve poppet 7. Therefore, when the valve poppet 7 is moved by a suitable distance $x$ in the upstream direction, corresponding portions of the orifices 13a and 13b are brought to positions above the upper surface of a valve seat 11 and bottom wall of the fluid chamber 5b respectively, and the hydraulic fluid flowing into the fluid chamber 5a through the fluid inlet 3 and fluid passage 16a passes through these portions of the orifices 13a and 13b, fluid passage 16b, fluid chamber 5b and fluid passage 16c to be discharged from the fluid outlet 15.

Figure 9A:
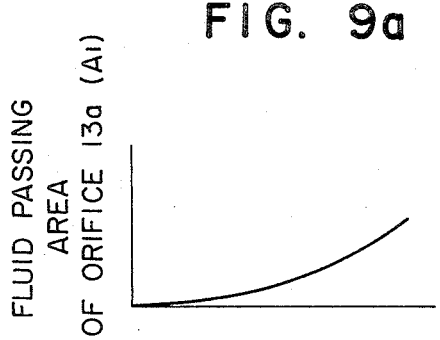
FIGS. 9a, 9b, 9c, 9d and 9e are graphs showing the fluid passing area of the orifice 13a, fluid passing area of the orifice 13b, flow rate of fluid passing through the orifice 13a, fluid pressure in the space between the orifices 13a and 13b, and ratio between fluid pressures on the upstream and downstream sides of the poppet valve member having the orifice 13a respectively when the poppet valve member shown in FIG. 8 is lifted by some distance x in the upstream direction.
Figure 9B:
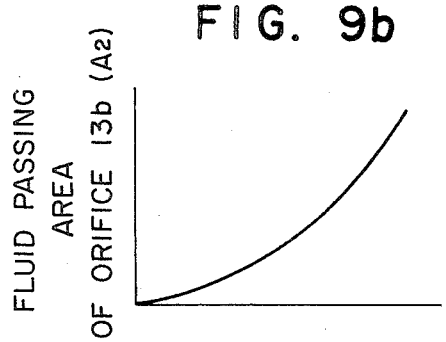
Figure 9C:
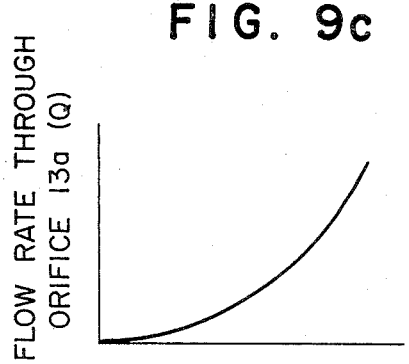
Figure 9D:
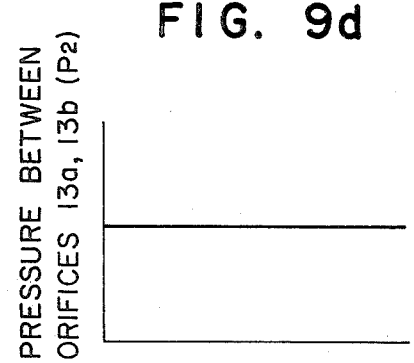
Figure 9E:
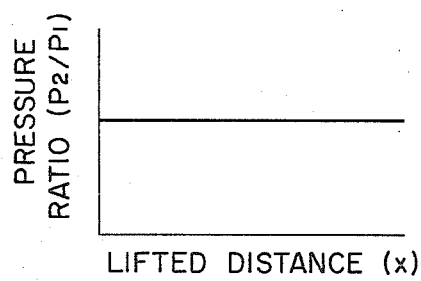
Figure 10:
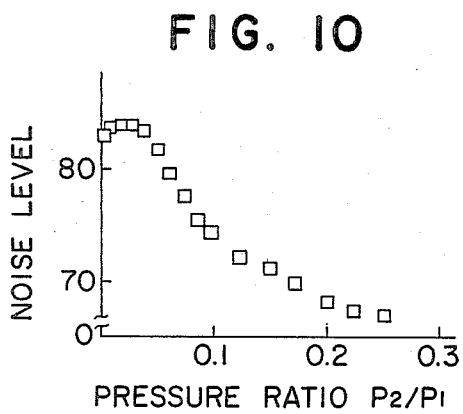
FIG. 10 is a graph showing how the noise level can be reduced by the use of the valve shown in FIG. 8.

In the valve structure above described, the fluid passing areas $A_1$ and $A_2$ of the orifices 13a and 13b vary as shown in FIGS. 9a and 9b respectively when the valve poppet 7 is moved by a suitable distance $x$ in the upstream direction. Thus, when the flow passing area $A_1$ of the orifice 13a varies in a manner as shown in FIG. 9a, the flow rate Q of fluid passing through this orifice 13a varies in a manner as shown in FIG. 9c provided that the fluid pressure $P_1$ on the upstream side is constant. There is a corresponding flow rate variation of fluid passing through the flow passing area $A_2$ of the orifice 13b. It is thus possible to maintain the fluid pressure $P_2$ in the fluid passage 16b constant as seen in FIG. 9d by suitably selecting these fluid passing areas $A_1$ and $A_2$ of the respective orifices 13a and 13b. Consequently, the fluid pressure ratio $P_2/P_1$ between the fluid pressure $P_2$ in the fluid passage 16b and the fluid pressure $P_1$ in the fluid passage 16a can be maintained substantially constant as seen in FIG. 9e, and this ratio $P_2/P_1$ can be maintained within the range of 0.05 to 0.5. Vibration damping members 17a, 17b and 17c of material such as rubber having a large internal damping factor are fixed in position by locking rings 23a, 23b and 23c on the inner walls 14a, 14b and 14c of the fluid passages 16a, 16b and 16c respectively so as to reduce cavitation noise in conjunction with the limitation of the ratio $P_2/P_1$ between the fluid pressures $P_2$ and $P_1$ in the fluid passages 16b and 16a to the range of 0.05 to 0.5. FIG. 10 shows the relation between the noise level and the fluid pressure ratio $P_2/P_1$ in the valve structure shown in FIG. 8. It will be seen from FIG. 10 that the noise level can be reduced by more than about 20 phons in C-scale. The effect similar to that above described may be obtained without the provision of the vibration damping members when the cavitation occurring in the portion downstream of the orifice 13a is relatively weak. Further, a plurality of orifices may be formed in the valve skirt of a single valve member in lieu of provision of a plurality of valve members so that manipulation of the single valve member can attain the same effect as when a plurality of valve members are manipulated.

The embodiment shown in FIG. 8 is featured by the fact that it comprises at least two valve members for carrying out flow rate control of fluid flowing from the high pressure to the low pressure side and a variation in the flow passing area of the upstream side valve member is followed by a corresponding variation in the fluid passing area of the downstream side valve member to deal with any variations in the flow rate of the fluid flowing through the valve, so that the ratio between the fluid passing areas of the valve members can be maintained always constant and the fluid pressure ratio between the fluid pressures on the downstream and upstream sides of the upstream side valve member can be limited to the range of 0.05 to 0.5 thereby imparting a substantially constant back pressure to the upstream side valve member. By virtue of this arrangement, a great reduction can be attained in the pressure pulsation and noise due to cavitation caused by an extremely large pressure differential across the valve.

While the present invention has been described with regard to a flow control valve which is used in a ram type hydraulic elevator system and which is subjected to an extremely large pressure differential thereacross, the present invention is also appplicable to any other valves such as relief valves, pilot check valves and spool valves in which an extremely large pressure differential appears similarly thereacross.

I claim:

1. A valve arrangement comprising: a valve body having a fluid passage portion, a valve means disposed in said valve body for controlling the flow of fluid through said valve body, means provided downstream of said valve member extending substantially along the entire inner wall of said fluid passage portion for damping undesirable vibrations, and means disposed within said fluid passage portion downstream of said means for damping undesirable vibrations for supplying a back pressure to the downstream side of said valve member.

2. A valve arrangement according to claim 1, wherein said last mentioned means is a partition means disposed in said fluid passage portion downstream of said means for damping undesirable vibrations.

3. A valve arrangement according to claim 2, wherein said partition means includes at least one aperture therein for permitting a predetermined back pressure on said valve means.

4. A valve arrangement according to claim 3, wherein at least a pair of means for damping undesirable vibrations are provided in said fluid passage portion.

5. A valve arrangement according to claim 1, wherein said means for damping undesirable vibrations is a deformable member having a large internal damping effect, and wherein means are provided for preventing undesirable deformation of said member.

6. A valve arrangement according to claim 5, wherein said last-mentioned means includes a coil spring provided in said deformable member.

7. A low-noise valve comprising: a fluid passage portion, a valve body having a valve member disposed in a high-pressure fluid conduit system for controlling the flow rate of hydraulic fluid from the high pressure to a low-pressure side, vibration damping means disposed within said valve body along the inner wall of the fluid passage portion on the downstream side of said valve member, and means disposed within said fluid passage portion downstream of said vibration damping means for imparting a back pressure to the low-pressure downstream side of said valve member.

8. A low-noise valve as claimed in claim 7, wherein the back pressure imparted to the low-pressure downstream side of said valve member is substantially constant.

9. A low-noise valve as claimed in claim 8, wherein at least one additional valve member is disposed in said valve body on the downstream side of said valve member, said additional valve member imparting the back pressure to said upstream side valve member.

10. A low-noise valve as claimed in claim 9, wherein said upstream side valve member and said downstream side valve member are constructed to effect interlocking operation.

11. A low-noise valve as claimed in claim 8, wherein said valve member is composed of a valve poppet and a valve skirt, and a plurality of orifices are formed in said valve skirt.

12. A low-noise valve as claimed in claim 7, wherein said vibration damping means is removably mounted in place.

13. A low-noise valve as claimed in claim 7, wherein said vibration damping means is composed of a rubber member and a supporting member embedded in said rubber member for preventing undesirable deformation of said rubber member.

14. A low-noise valve as claimed in claim 13, wherein said supporting member is a coil spring.

15. A valve arrangement comprising: a valve body having a fluid passage portion, a valve means disposed in said valve body for controlling the flow of fluid through said valve body, means provided downstream of said valve member extending substantially along the entire inner wall of said fluid passage portion for damping undesireable vibrations, and means for supplying a back pressure to the downstream side of said valve member including a partition means disposed in said fluid passage portion downstream of said valve means, said partition means including at least one aperture therein for permitting a predetermined back pressure on said valve means, said meaans for damping undesireable vibrations including at least a pair of damping means disposed in said fluid passage portion, said pair of damping means being disposed on respective sides of said partition means, and wherein a second partition means is provided downstream of the second damping means.

16. A valve arrangement according to claim 15, wherein said damping means consists of deformable members having a large internal damping effect.

17. A low-noise valve comprising: a fluid passage portion, comprising a valve body having a valve member disposed in a high-pressure fluid conduit system for controlling the flow rate of hydraulic fluid from the high-pressure to a low-pressure side, vibration damping means disposed within said valve body along the inner wall of the fluid passage portion on the downstream side of said valve member, and means for imparting a back pressure to the low-pressure downstream side of said valve member, wherein the back pressure is imparted so that the ratio of $P_2/P_1$ between the fluid pressures $P_2$ and $P_1$ on the downstream and upstream sides of said valve member lies within the range of 0.05 to 0.5.

18. A low-noise valve comprising: a fluid passage portion, a valve body having a valve member disposed in a high-pressure fluid conduit system for controlling the flow rate of hydraulic fluid from the high-pressure to a low-pressure side, vibration damping means disposed within said valve body along the inner wall of the fluid passage portion on the downstream side of said valve member, means for imparting a back pressure to the low-pressure downstream side of said valve member, said back pressure imparted to the low-pressure downstream side of said valve member being substantially constant, and at least one additional valve member disposed in said valve body on the downstream side of said valve member, said additional valve member imparting the back pressure to said upstream side valve member, wherein the ratio between the fluid passing cross-sectional areas of said upstream side valve member and said downstream side valve member is selected to be substantially constant, and the ratio of $P_2/P_1$ between the upstream side fluid pressure $P_1$ at the upstream side valve member and the downstream side fluid pressure $P_2$ is selected to lie within the range of 0.05 to 0.5.

* * * * *